(12) United States Patent
Raghoebardajal et al.

(10) Patent No.: US 12,118,733 B2
(45) Date of Patent: Oct. 15, 2024

(54) APPARATUS AND METHOD FOR VIRTUAL REALITY

(71) Applicant: Sony Interactive Entertainment Europe Limited, London (GB)

(72) Inventors: Sharwin Winesh Raghoebardajal, London (GB); Jose Rubio, London (GB); Steven Tattersall, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 18/145,540

(22) Filed: Dec. 22, 2022

(65) Prior Publication Data

US 2023/0215023 A1 Jul. 6, 2023

(30) Foreign Application Priority Data

Dec. 31, 2021 (GB) ..................................... 2119134

(51) Int. Cl.
*G06F 3/01* (2006.01)
*G06T 7/246* (2017.01)

(52) U.S. Cl.
CPC .............. *G06T 7/248* (2017.01); *G06F 3/012* (2013.01); *G06T 2207/10021* (2013.01)

(58) Field of Classification Search
CPC .......... G06F 3/012; G06F 3/013; G06T 7/246
See application file for complete search history.

(56) References Cited

U.S. PATENT DOCUMENTS

| 10,217,271 | B2* | 2/2019 | Hwang | ................ | G06T 15/205 |
| 11,113,894 | B1* | 9/2021 | Price | ..................... | G06T 19/006 |
| 2013/0156264 | A1* | 6/2013 | Martensson | ............. | G06T 7/73 |
| | | | | | 382/103 |
| 2017/0084074 | A1* | 3/2017 | Hwang | ............. | G02B 27/0172 |

(Continued)

OTHER PUBLICATIONS

Cutolo, F. et al., "Optical See-Through Head-Mounted Displays With Short Focal Distance: Conditions for Mitigating Parallax-Related Registration Error" Frontiers in Robotics and AI, Dec. 2020, vol. 7, pp. 1-15.

(Continued)

*Primary Examiner* — Sepehr Azari
(74) *Attorney, Agent, or Firm* — Lerner David LLP

(57) ABSTRACT

A data processing apparatus comprises receiving circuitry to receive tracking data indicative of at least one of a tracked position and orientation of a head-mountable display (HMD), image processing circuitry to generate a sequence of images frames for display in dependence upon the tracking data, detection circuitry to detect an image feature in a first image frame and to detect a corresponding image feature in a second image frame, and correlation circuitry to: calculate a difference between the image feature in the first image frame and the corresponding image feature in the second image frame; generate difference data indicative of a difference between a viewpoint for the first image frame and a viewpoint for the second image frame in dependence upon the difference between the image feature in the first image frame and the corresponding image feature in the second image frame; and generate output data in dependence upon a difference between the difference data and the tracking data associated with the first and second image frames.

15 Claims, 10 Drawing Sheets

(56) References Cited

U.S. PATENT DOCUMENTS

| | | | |
|---|---|---|---|
| 2018/0047332 A1* | 2/2018 | Kuwahara | G06F 3/012 |
| 2018/0059780 A1* | 3/2018 | Mitchell | A63F 13/21 |
| 2018/0061121 A1* | 3/2018 | Yeoh | H04N 13/344 |
| 2018/0167607 A1* | 6/2018 | Okamoto | H04N 5/64 |
| 2019/0033962 A1* | 1/2019 | Yakishyn | G06F 3/0485 |
| 2019/0295323 A1 | 9/2019 | Gutierrez et al. | |
| 2020/0043236 A1* | 2/2020 | Miller | G02B 27/0179 |
| 2020/0320793 A1 | 10/2020 | Marcolina et al. | |
| 2020/0372678 A1* | 11/2020 | Farmer | G06F 3/013 |
| 2020/0409458 A1* | 12/2020 | Smithwick | G06F 3/013 |
| 2021/0208390 A1* | 7/2021 | Price | H04N 13/344 |

OTHER PUBLICATIONS

Peillard, E. et al., Can Retinal Projection Displays Improve Spatial Perception in Augmented Reality? 2020 IEEE International Symposium on Mixed and Augmented Reality (ISMAR), Nov. 2020, pp. 1-9.

Extended European Search Report including Written Opinion for Application No. 22214949.4 dated May 25, 2023, pp. 1-13.

Combined Search and Examination Report for Application No. GB2119134.1 dated Jun. 29, 2022. 2 pgs.

\* cited by examiner

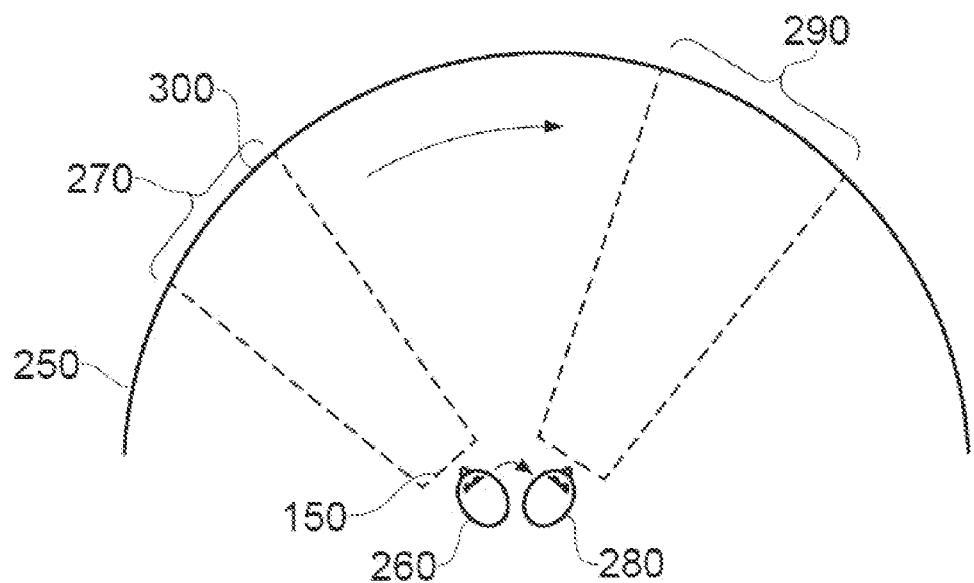
FIG. 6
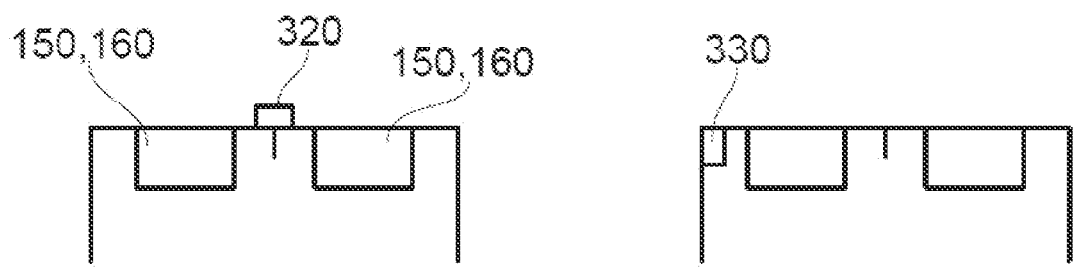
FIG. 7A
FIG. 7B

APPARATUS AND METHOD FOR VIRTUAL REALITY

CROSS-REFERENCES TO RELATED APPLICATIONS

The present application claims the benefit of and priority to GB Application No. 2119134.1, filed on Dec. 31, 2021, the disclosure of which is incorporated herein by reference.

BACKGROUND OF THE INVENTION

Field of the Invention

The present disclosure relates to apparatus and methods for virtual reality. In particular, the present disclosure relates to data processing apparatus and methods for evaluating tracking data and image frames generated for display using such tracking data.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

Although the original development of HMDs and virtual reality was perhaps driven by the military and professional applications of these devices, HMDs are becoming more popular for use by casual users in, for example, computer game or domestic computing applications.

The techniques to be discussed are applicable to individual three-dimensional images or to video signals comprising successive three-dimensional images. Therefore, references to "images" in the discussion below should be taken to encompass the use of the same techniques in respect of video signals.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY OF THE INVENTION

It is to be understood that both the foregoing general description and the following detailed description are exemplary, but are not restrictive, of the invention.

Various aspects and features of the present invention are defined in the appended claims and within the text of the accompanying description.

BRIEF DESCRIPTION OF THE DRAWINGS

The present technique will be described further, by way of example only, with reference to embodiments thereof as illustrated in the accompanying drawings, in which:

FIG. 6 schematically illustrates a change of view of user of an HMD;

FIGS. 7a and 7b schematically illustrate HMDs with motion sensing;

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
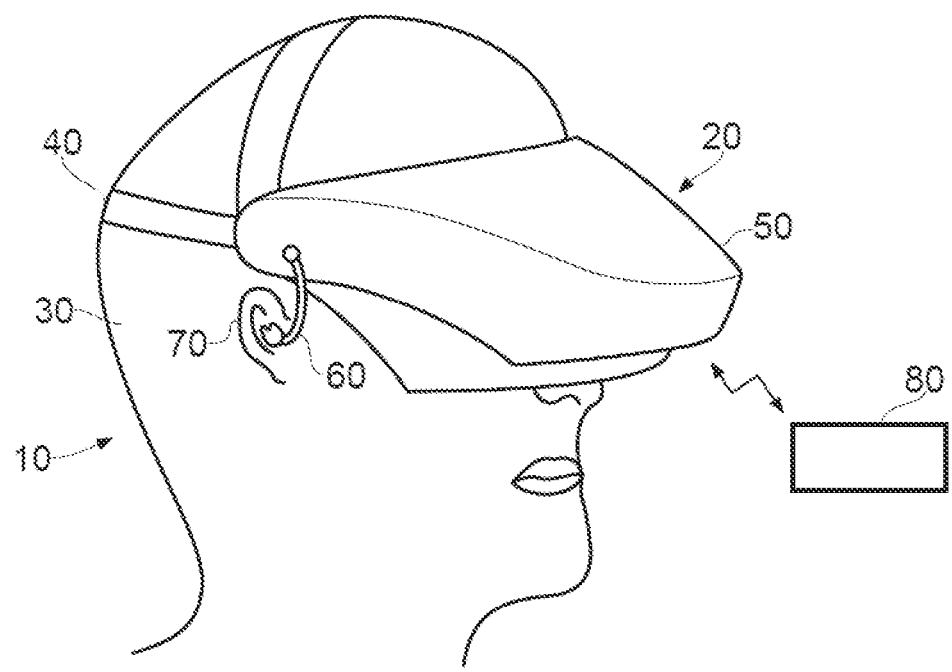
FIG. 1 schematically illustrates an HMD worn by a user.

Referring now to the drawings, wherein like reference numerals designate identical or corresponding parts throughout the several views, in FIG. 1, a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
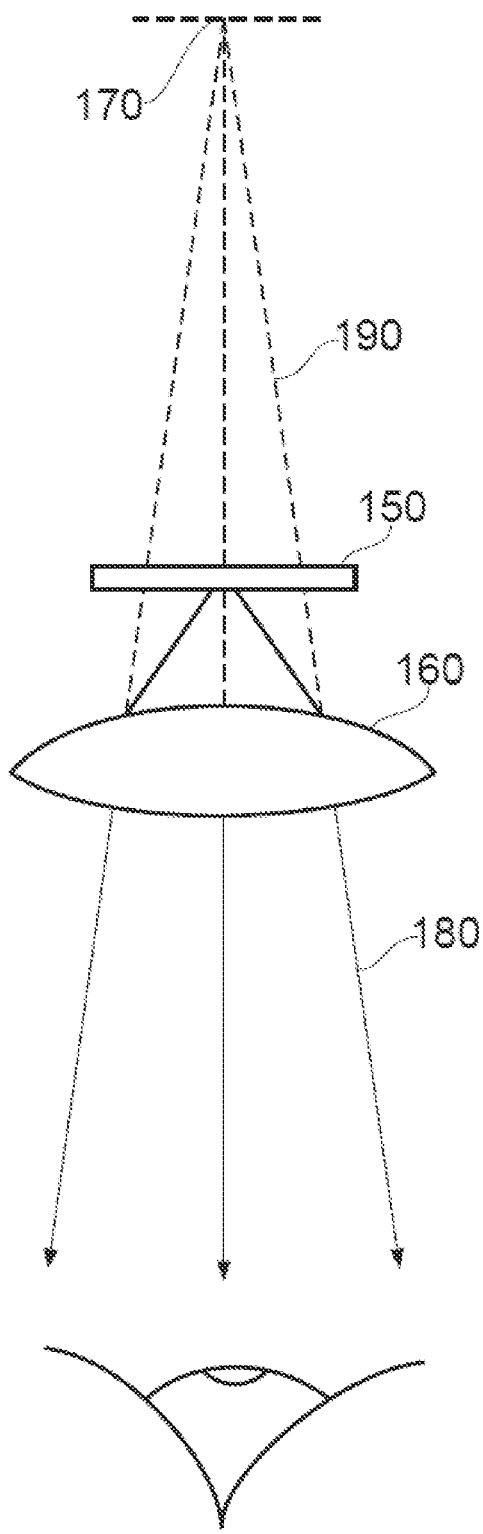
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
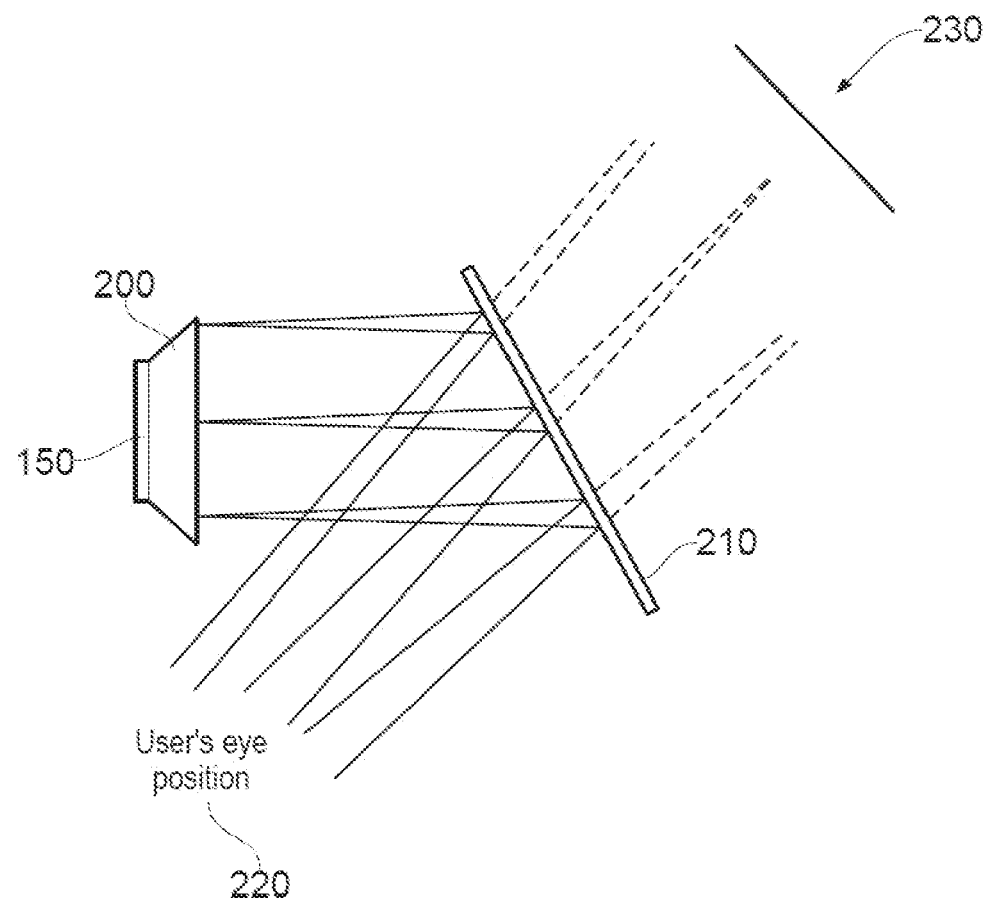
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 (and those in FIG. 15 to be described below) could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer, In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

This tracking is carried out by detecting motion of the HMD and varying the apparent viewpoint of the displayed images so that the apparent viewpoint tracks the motion. This is discussed in more detail later.

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment. Similar considerations apply to the up-down component of any motion.

Figure 2:
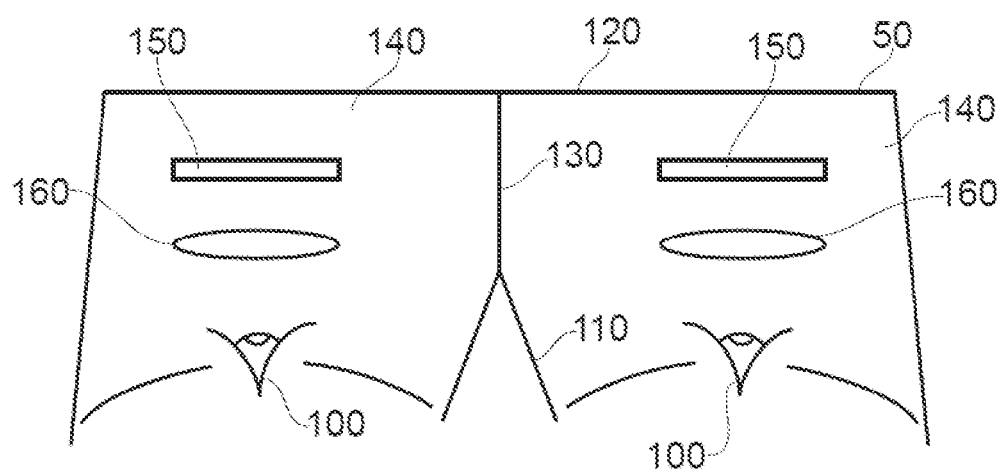
FIG. 2 is a schematic plan view of an HMD.

FIGS. 7a and 7b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the HMD and generating corresponding tracking data for the HMD.

In FIG. 7a, a forward-facing camera 320 is provided on the front of the HMD. This does not necessarily provide images for display to the user (although it could do so in an augmented reality arrangement). Instead, its primary purpose in the present embodiments is to allow motion sensing. A technique for using images captured by the camera 320 for motion sensing will be described below in connection with FIG. 8. In these arrangements, the motion detector comprises a camera mounted so as to move with the frame; and an image comparator operable to compare successive images captured by the camera so as to detect inter-image motion.

FIG. 7b makes use of a hardware motion detector 330 for generating tracking data. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 8:
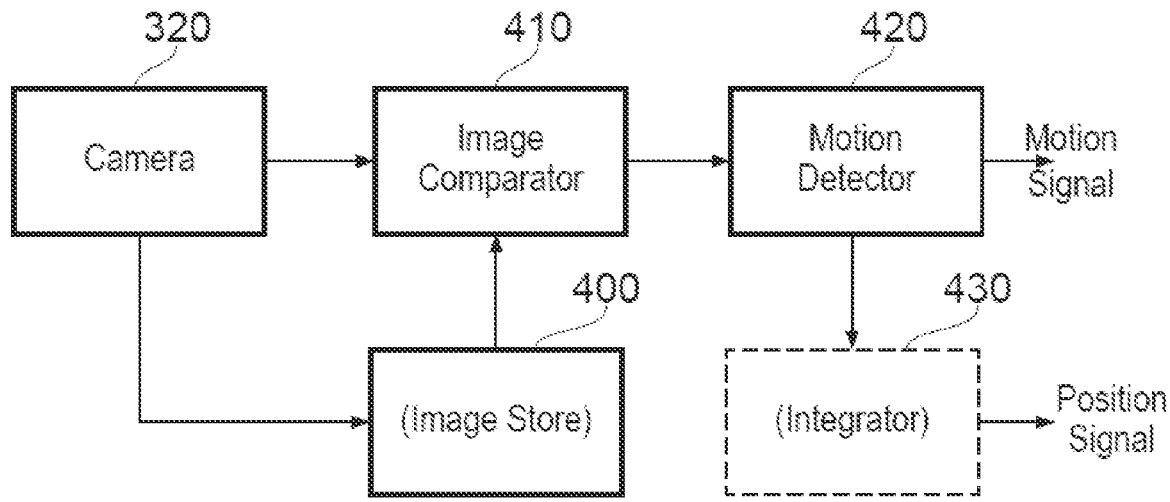
FIG. 8 schematically illustrates a position sensor based on optical flow detection.

FIG. 8 schematically illustrates one example of motion detection using the camera 320 of FIG. 7a.

The camera 320 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical fow" detection) to establish whether substantially the whole image captured by the camera 320 has moved since the time at which the preceding image was captured. Localised motion might indicate moving objects within the field of view of the camera 320, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 330 such as an accelerometer. This can in fact give a faster response in respect of the indication of motion, given that the response time of the video-based system is at best the reciprocal of the image capture rate. In some instances, therefore, the detector 330 can be better suited for use with higher frequency motion detection. However, in other instances, for example if a high image rate camera is used (such as a 200 Hz capture rate camera), a camera-based system may be more appropriate. In terms of FIG. 8, the detector 330 could take the place of the camera 320, the image store 400 and the comparator 410, so as to provide an input directly to the motion detector 420. Or the detector 330 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 9:
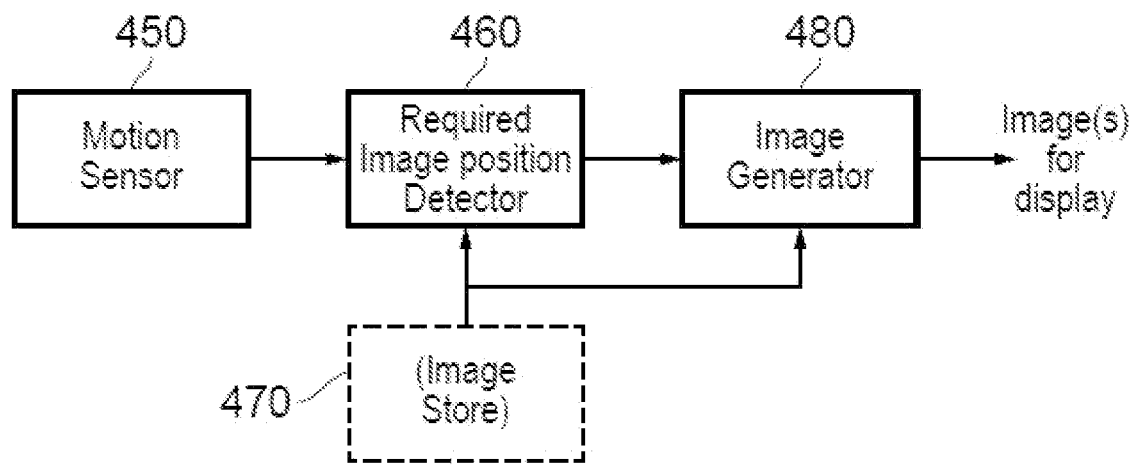
FIG. 9 schematically illustrates the generation of images in response to HMD position or motion detection.

FIG. 9 schematically illustrates image processing carried out in response to a detected position or change in position of the HMD.

As mentioned above in connection with FIG. 6, in some applications such as virtual reality and augmented reality arrangements, the apparent viewpoint of the video being displayed to the user of the HMD is changed in response to a change in actual position or orientation of the HMD and the user's head.

With reference to FIG. 9, this is achieved by a motion sensor 450 (such as the arrangement of FIG. 8 and/or the motion detector 330 of FIG. 7b) supplying data (tracking data) indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

The image generator 480 may act on the basis of metadata such as so-called view matrix data, in a manner to be described below.

Figure 10:
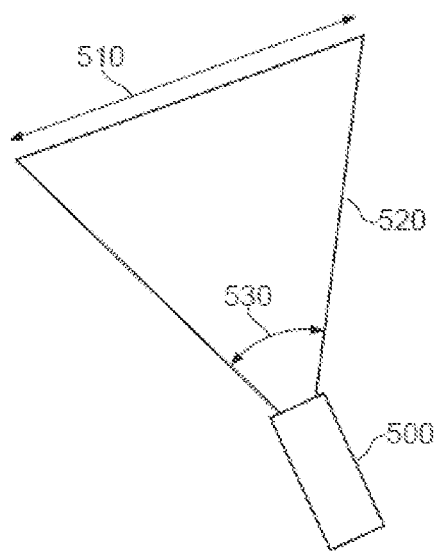
FIG. 10 schematically illustrates the capture of an image by a camera.

In order to illustrate schematically some of the general concepts associated with the present technology, FIG. 10 schematically illustrates the capture of an image by a camera.

Referring to FIG. 10, a camera 500 captures an image of a portion 510 of a real-world scene. The field of view of the camera 500 is shown schematically as a generally triangular shape 520, such that the camera is at one apex of the generally triangular shape, the sides adjacent to the camera schematically indicate the left and right extremes of the field of view and the side opposite the camera schematically illustrates the portion of the scene which is captured. Note that the camera 500 may be a stills camera or a video camera capturing a succession of images, separated by time intervals. Note that the images do not have to be camera-captured images. These techniques are all equally applicable to machine-generated images such as images generated by a computer games machine for display to the user as part of the process of playing a computer game.

Figure 11:
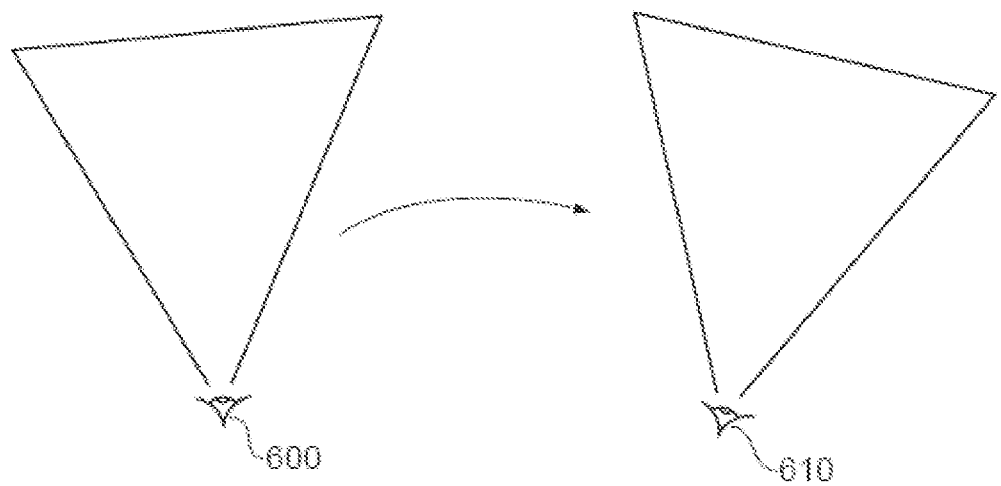
FIG. 11 schematically illustrates a latency issue with HMD image display.

FIG. 11 schematically illustrates a latency issue with HMD image display. As discussed above, the position and/or orientation of an HMD can be used, for example as discussed with reference to FIG. 9, so that an image for display is generated for display according to the detected position and/or orientation of the HMD. In the case of viewing a portion of a wider captured image, or generating a required image as part of computer game play, the arrangement discussed with reference to FIG. 9 involves detecting the current position and/or orientation of the HMD and generating appropriate image data for display.

However, the latency involved in this process can lead to an incorrect image being generated.

Referring to FIG. 11, consider a situation in which the user's viewpoint is rotating (in a clockwise direction as illustrated schematically in FIG. 11) from a first viewpoint 600 to a second viewpoint 610, over the course of a time interval of the order of an image repetition period of the image displays used in the HMD (for example, ½₅ second). Note that the two representations in FIG. 11 are shown side-by-side, but this is for the purposes of the drawing rather than necessarily indicating a translation of the user viewpoint (although some translation could be involved between the two viewpoints).

In order to allow time for the next output image to be generated, the position and/or orientation of the HMD is detected when the HMD is at the viewpoint 600. The next image for display is then generated, but by the time that image is actually displayed, the viewpoint has rotated to the viewpoint 610. The result is that the image is displayed is incorrect for the user's viewpoint 610 at the time that image is displayed. This can provide a subjectively poorer experience for the user, and may possibly lead to disorientation or even nausea on the part of the user.

The techniques to be discussed below relate to evaluating tracking data and image frames generated for display using the tracking data to detect discrepancies. As mentioned above, in some virtual reality and augmented reality arrangements a viewpoint for an image frame generated for display is changed from one image frame to another in response to a change in actual position and/or orientation of the HMD and the user's head so that the images appear to track the movement of the HMD and the user's head. Differences between the tracked position and/or orientation of the HMD and the position and/or orientation of the viewpoint for the generated image frames can lead to a loss of immersion for a viewing user and potentially induce motion sickness. There is therefore a need to detect discrepancies between the tracking of the HMD and the images generated for display using the tracking data.

Figure 12:
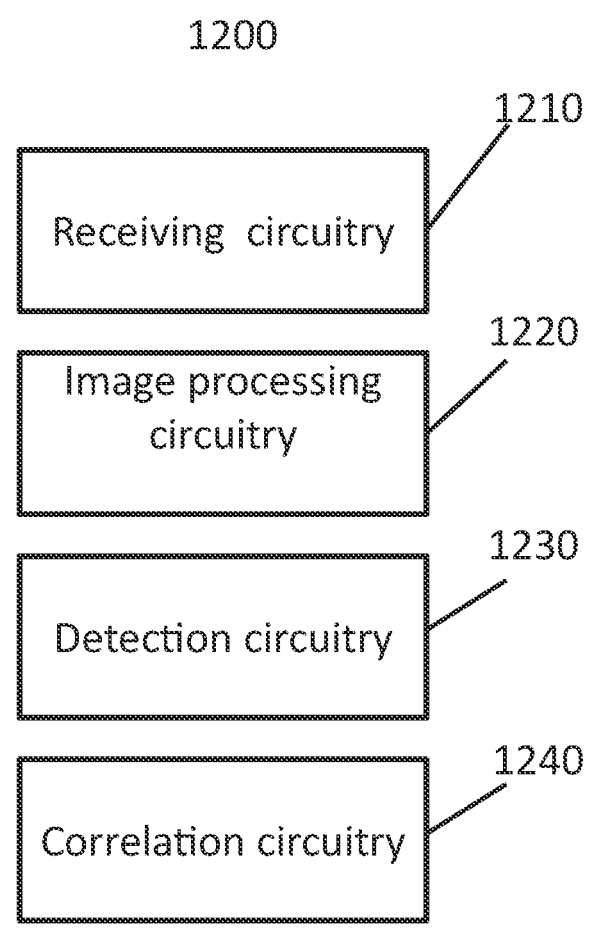
FIG. 12 schematically illustrates a data processing apparatus.

Referring now to FIG. 12, in embodiments of the disclosure a data processing apparatus 1200 comprises: receiving circuitry 1210 to receive tracking data indicative of at least one of a tracked position and orientation of a head-mountable display (HMD); image processing circuitry 1220 to generate a sequence of images frames for display in dependence upon the tracking data; detection circuitry 1230 to detect an image feature in a first image frame and to detect a corresponding image feature in a second image frame; and correlation circuitry 1240 to: calculate a difference between the image feature in the first image frame and the corresponding image feature in the second image frame; generate difference data indicative of a difference between a viewpoint for the first image frame and a viewpoint for the second image frame in dependence upon the difference between the image feature in the first image frame and the corresponding image feature in the second image frame; and generate output data in dependence upon a difference between the difference data and the tracking data associated with the first and second image frames.

The data processing apparatus 1200 may for example be provided as part of a general purpose computing device, such as a personal computer, so that the receiving circuitry 1210 receives tracking data for an HMD via at least one of a wired and wireless communication (e.g. Bluetooth® or WiFi®) with an HMD. The data processing apparatus 1200 may in some cases be provided as part of an HMD or a game console (such as the Sony® PlayStation 5 ®) operable to generate images for display for a video game or other suitable content. Alternatively, the data processing apparatus 1200 may in some cases be implemented in a distributed manner using a combination of an HMD and a game console operable to generate images for display by the HMD.

The receiving circuitry 1210 is configured to receive the tracking data indicative of a tracked position and/or orientation of an HMD. The receiving circuitry 1210 can receive the tracking data according to a wired or wireless communication with an HMD. Alternatively or in addition, an external camera mounted so as to capture images including the HMD may be used to generate the tracking data for the HMD using so-called outside-in tracking, and the tracking data can be received by the receiving circuitry 1210 from an external tracker comprising one or more such cameras. More generally, the tracking data is indicative of a tracked position and/or orientation of the HMD with respect to the real-world environment and may be obtained using a combination of image sensors provided as part of the HMD and/or provided externally to the HMD and/or hardware motion sensors (as discussed previously with respect to FIGS. 8 and 9). The tracking data may be obtained via fusion of sensor data from one or more image sensors and one or more hardware motion sensors.

In some cases, the receiving circuitry 1210 receives the tracking data during an ongoing display of a sequence of images by the HMD. Hence, in some examples the receiving circuitry 1210 receives the tracking data during the display of the sequence of images generated for display by the image processing circuitry 1220, and the received tracking data is used to generate further image frames to be displayed by the HMD. Movements of the user's head during display of images by the HMD causing a change in position and/or orientation of the HMD can be detected using image-based tracking and/or inertial sensor data (as discussed previously with respect to FIGS. 8 and 9) and the corresponding tracking data received by the receiving circuitry 1210. However, in some cases tracking data previously generated by tracking the HMD during a previous game session may be stored, for example by a game console and/or the HMD, and the receiving circuitry 1210 can be configured to receive the stored tracking data from the storage. In this case, the stored tracking data may be received and used by the data processing apparatus 1200 to generate a sequence of image frames to conduct and offline evaluation for detecting discrepancies between the tracking data of the HMD and the images generated for display by the image processing circuitry 1220 using the stored tracking data.

The tracking data indicates a position and/or orientation of the HMD over a period of time and changes in the physical position and/or orientation of the HMD are thus reflected in the tracking data. For example, the receiving circuitry 1210 may receive tracking data comprising a 3D position and orientation for the HMD and as associated timestamp, and such data may be received periodically at a rate that is dependent on the sensor technology used for tracking. The position and orientation for the HMD having a given timestamp may indicate a position and orientation for the HMD relative to a reference point within the real-world environment, or in some cases the position and orientation for the HMD having a given timestamp may indicate a change in the position and orientation for the HMD relative to a position and orientation for a previous timestamp.

The image processing circuitry 1220 is configured to generate a sequence of image frames for display in dependence upon the tracking data received by the receiving circuitry 1210. The image processing circuitry 1220 comprises at least one of a CPU and a GPU operable to perform image processing operations for generating image data for display. Image processing operations typically comprise processing of model data or other predefined graphical data to obtain pixel values for the image pixels in the image frame. Unless otherwise specified, references herein to image frames refer to either stereoscopic image frames comprising left and right images, or a single image frame that is to be viewed by both eyes of the user. The image processing circuitry 1220 generates a sequence of images frames comprising a plurality of successive image frames such that a viewpoint for the image frames changes in accordance with the changes in the position and/or orientation of the HMD indicated by the tracking data. The sequence of image frames may visually represent a content such as a virtual reality content or an augmented reality content. Hence, the user can move their head to thereby change the position and/or orientation of the HMD and image frames are generated for display accordingly so that the viewpoint for the image frames moves in a corresponding fashion to the user's head movements.

The tracking data thus indicates a first position and/or orientation for the HMD at a first point in time (T1) and indicates a second position and/orientation for the HMD at a second point in time (T2), wherein T2 is later than T1. The image processing circuitry 1220 generates a given image frame for display in dependence upon the tracking data at the first point in time to thereby generate the given image frame with a viewpoint that is dependent upon the first position and/or orientation of the HMD, and subsequently generates another image frame for display in dependence upon the tracking data at the second point in time to thereby generate the subsequent image frame with a viewpoint that is dependent upon the second position and/or orientation of the HMD. In this way, the viewpoint for the respective image frames changes according to the changes in the position and/or orientation of the HMD. In particular, the image processing circuitry 1210 calculates a viewpoint (or a change in a viewpoint with respect to a previously calculated viewpoint) in dependence upon the tracking data and generates the image frame for display according to the calculated viewpoint, in which the calculated viewpoint is updated responsive to the most recently received tracking data.

The image processing circuitry 1220 is configured to generate the sequence of image frames at any suitable frame rate. For example, many HMDs use a frame rate of 60, 90 or 120 Hz and the image processing circuitry 1220 is operable to generate images for display at such frame rates. The image processing circuitry 1220 thus generates a sequence of images frames for display according to the changes in the tracking data in which image frame has a viewpoint derived in dependence upon a most recent position and/or orientation indicated by the tracking data.

The detection circuitry 1230 is configured to detect image features in the sequence of image frames generated by the image processing circuitry 1220 by detecting at least an image feature included in a first image frame generated for display at a first time with a first viewpoint and a corresponding image feature included in a second image frame generated for display at a second time with a second viewpoint different from the first viewpoint.

Image features detectable by the detection circuitry 1230 include points, edges and virtual objects included within an image frame. Graphics processing operations are performed by the image processing circuitry 1220 as part of an execution of an application such as a computer game and may comprise processing of model data or other predefined graphical data in accordance with a graphics processing pipeline to generate image data for rendering data for display as an image frame. The image processing circuitry 1220 may thus generate an image frame comprising one or more virtual objects by performing graphics processing operations using input data structures for various virtual objects. Hence, in some cases the detection circuitry 1230 is configured to detect an image of a virtual object in a first image frame and to detect an image of a corresponding virtual object in another image frame. For example, an image of a virtual tree in one image frame and a corresponding image of the same virtual tree in another image frame having a different viewpoint may be detected, and as such the same virtual tree is viewed from two different viewpoints and will have a different appearance in the two image frames due to the different viewpoints. Known computer vision techniques may be used to detect virtual objects in this way.

The detection circuitry 1230 may use feature point matching techniques. A set of feature points for an image feature can be detected in the image frames using known computer vision techniques. For example, a corner detection algorithm such as FAST (Features from Accelerated Segment Test) can be used to extract feature points corresponding to the corners of one or more elements in the image, such as a corner of a chair or a corner of a wall. Feature point matching between the image frames can be used to detect an image feature in one image frame and the same image feature in another image frame.

The detection circuitry 1230 can thus detect feature points in a given image frame and generate a data set comprising a plurality of detected feature points for the given image frame, in which each detected feature point is associated with image information indicative of an image property for the detected feature point. The image property associated with a detected feature point can be compared with an image property in another image frame (such as a next image frame or another later image frame in the sequence) so as to detect when the detected feature point is included in another image frame having another viewpoint. In some examples, the image information may comprise an image patch extracted from an image frame such that the image patch comprises a small area of image data (small relative to the size of the whole image frame) which can be used as a reference for detecting when the detected feature point is included in another image (e.g. small area of pixel data). The image information is thus indicative of an image property for the detected feature point so that information regarding a visual appearance as viewed in the captured image can be used for reference when later identifying a subsequent detection of that same feature point in another image.

Hence more generally, a given image feature can be detected in a first image frame and the same given image feature (also referred to as a corresponding image feature) can be detected in another image frame. The two image frames have different viewpoints but both include at least one image feature that is common to both and viewed from the two different viewpoints. Based on the geometric differences between the at least one image feature that is common to both of the image frames, a difference between the viewpoints for the two image frames is calculated. Moreover, in some examples, a same image feature can be detected across multiple image frames in the sequence of image frames with each image frame having a different associated viewpoint and the image feature thus having a different position and/or orientation with respect to the image frames. Hence, whilst the following discussion refers to a first image frame and a second image frame and calculating a difference between the viewpoints for the two image frames, the techniques can be applied for any number of image frames to calculate a difference between the viewpoints for the respective image frames.

In the case of an image feature corresponding to a portion of a virtual environment that is static, the image feature should appear to the user as having a fixed position within the virtual environment. Consequently, movements of the user's head causing a change in the user's viewpoint with respect to the virtual environment result in image frames being generated for display in which a position and/or orientation of the image feature within the image frames varies over time so that the image feature appears static with respect to the virtual environment. As explained above with reference to FIG. 6, an image feature that is static in the virtual environment appears to move within the sequence of image frames and therefore the geometric arrangement of the image feature in the sequence of image frames varies due to the different viewpoints.

The correlation circuitry 1240 is configured to calculate a difference between the image feature detected in a first image frame and the corresponding image feature detected in a second image frame. Any geometric difference between two corresponding image features detected in the two or more respective image frames can be calculated by the correlation circuitry 1240 for use in calculating a difference between the viewpoints for the two or more image frames. For example, a set of image feature points corresponding to a corner of a building, or an edge of a mountain in a background portion of the virtual environment can be detected in respective image frames and matched with each other as representing the same image feature but viewed from different viewpoints and differences in the geometric arrangement of the set of image feature points can be calculated to thereby calculate a difference between the viewpoints.

As explained above, one or more of the detected image features may for example be a virtual object generated for display by the image processing circuitry 1220. A virtual object, such as a virtual tree, may be included in the first image frame with a first position and orientation within the first image frame and may also be included in the second image frame with a second position and orientation within the second image frame. The position and orientation of the image feature within the image frame is dependent upon the viewpoint for the image frame, such that for image frames having different viewpoints a same image feature will have a different position and/or orientation within the image frame. Feature matching can be performed to match the virtual object in the respective image frames and the difference in position and/or orientation between the two image frames can be calculated. Moreover, in some cases the first image frame may comprise a plurality of virtual objects and at least some of the plurality of virtual objects may also be included in a second image frame, in which case feature matching can be performed to match the virtual objects between the image frames and differences in position and orientation between the two images frames for a plurality of objects can be calculated for use in calculating the difference between the viewpoints for the image frames.

The correlation circuitry 1240 thus calculates a difference between at least one image feature in the first image frame and a corresponding image feature in the second image frame, and generates difference data in dependence upon the difference between the image feature in the first image frame and the corresponding image feature in the second image frame. The difference data is indicative of a difference in the position and/or orientation of the viewpoint for the first image frame and the position and/or orientation of the viewpoint for the second image frame. As explained above, the difference data may be generated based on an image feature and a corresponding image feature detected in two respective image frames having difference viewpoints and/or may be generated based on a plurality of image features and a plurality of corresponding image features detected in two respective image frames.

The correlation circuitry 1240 is configured to generate output data in dependence upon a difference between the difference data generated for the first and second image frames and the tracking data associated with the first and second image frames. As explained above, the first image frame is generated for display in dependence upon the tracking data at a first point in time (T1) and the second image frame is generated for display in dependence upon the tracking data at a second point in time (T2) (note that a latency associated with the processing for generating an image frame for display is such that when the image frame is subsequently output for display, the viewpoint for the HMD at the time of outputting the image is different from the viewpoint previously used for generating the image frame, as discussed above with reference to FIG. 11). In an ideal scenario, a change in position of the HMD of N metres in a given direction (e.g. N=1 metre) is ideally reflected in the tracking data such that the tracking data indicates at the second point in time that the position of the HMD has change by N metres from the position of the HMD at the first point in time. Similarly, the difference data generated by the correlation circuitry 1240 based on the geometric differences between the image feature in the first image frame and the corresponding image feature in the second image frame should ideally be indicative of a difference of N metres (e.g. 1 metre) between the viewpoint for the first image frame and the viewpoint for the second image frame. The above discussion refers to an example of movement in a single axis for simplicity of explanation and it will be appreciated that changes in position and/or orientation within a 3D space can similarly be tracked. However, processing errors associated with generating an image frame for display can result in a change in the position and/or orientation of the HMD not matching a change in the position and/or orientation of the viewpoint for the generated image frames. In particular, errors in one or more stages of a graphics processing pipeline can lead to a discrepancy between the geometric properties of the generated image frames and the change in the position of the HMD for the image frames, such that the user perceives the displayed images as not faithfully tracking the user's head movements.

Hence, the correlation circuitry 1240 is configured to firstly calculate a geometric difference between two corresponding image features in two respective image frames, generate difference data indicative of a difference between a viewpoint for the first image frame and a viewpoint for the second image frame in dependence upon the calculated geometric difference, compare the difference data with the tracking data for the first image frame and the tracking data for the second image frame to calculate a difference between the change in the position and/or orientation of the HMD and the change in the position and/or orientation of the viewpoints for the first and second image frames, and generate output data in dependence upon the difference between the change in the position and/or orientation of the HMD and the change in the position and/or orientation of the viewpoints for the first and second image frames. In this way, the generated output data provides an indication of an amount of mismatch (when present) between the change in HMD viewpoint and the change in the viewpoint for the image frames. In more general terms, in the case of a change in the HMD viewpoint with respect to the real-world environment, an associated change in the virtual viewpoint with respect to the virtual environment can be calculated using image feature detection in two or more successive images frames, and the change in the real-world viewpoint is compared with the change in the virtual viewpoint and output data is generated to indicate any geometric differences (difference in position and/or orientation) between the change in the real-world viewpoint and the change in the virtual viewpoint.

The output data thus indicates at least one of a position offset and an orientation offset for the virtual viewpoint with respect to the HMD viewpoint indicated by the tracking data.

Figure 13A:
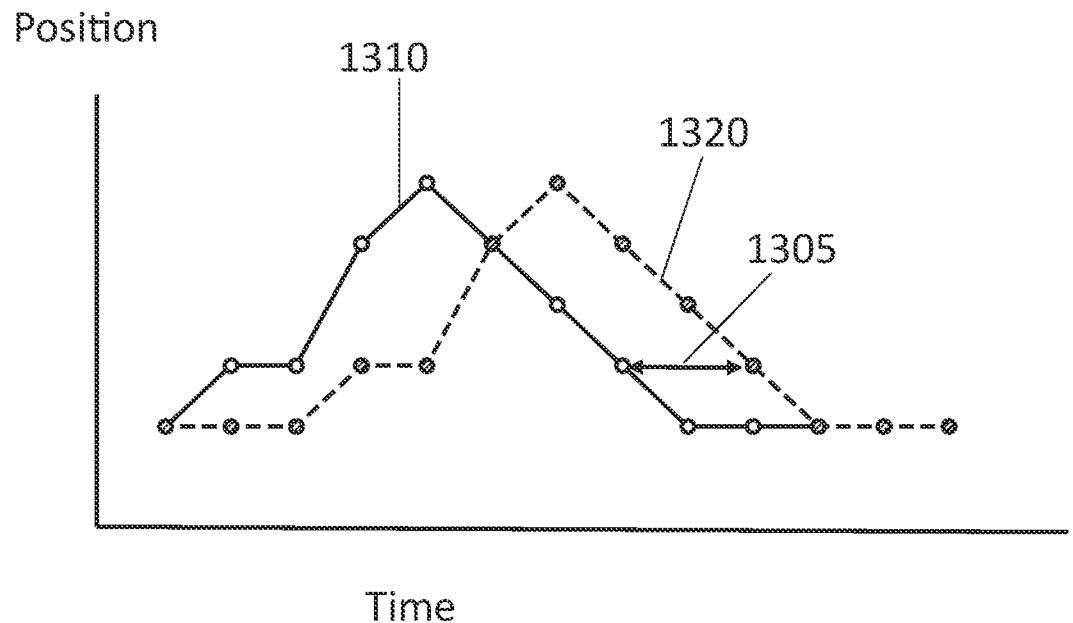
FIGS. 13a and 13b schematically illustrate timing diagrams.

FIG. 13*a* illustrates changes in a tracked position of an HMD and changes in a position of a viewpoint calculated for image frames generated according to tracking data indicative of the tracked position of the HMD. FIG. 13*a* schematically illustrates a timing diagram in which increasing time is represented from left to right along a horizontal axis and position with respect to a given axis of a three dimensional coordinate system is represented along the vertical axis (a single axis is shown for simplicity of explanation and it will be appreciated that the position and orientation of the HMD can be tracked with respect to a three-dimensional space using a three axis coordinate system). In the example shown, increasing position on the vertical axis represents an increase in distance with respect to a reference point. The data points 1310 represent the changes in the position of the HMD indicated by the tracking data and thus the changes in the position of the HMD viewpoint with respect to the real-world environment caused by a user's head movements. The data points 1320 represent the changes in the position of the viewpoint calculated for the generated image frames (calculated based on differences between image features) and thus the changes in the position of the virtual viewpoint. In the example of FIG. 13*a*, it can be seen that that a given change in the real-world viewpoint is reflected in a corresponding amount of change in the virtual viewpoint such that the system operates in an ideal manner and the position of the virtual viewpoint calculated by the correlation circuitry 1240 lags the position of the real-world viewpoint indicated by the tracking data by an amount indicated by the arrow 1305 due to the latency associated with generating an image frame for display. As such, FIG. 13*a* schematically illustrates a system operating in an ideal manner with latency associated with image frame generation causing an offset between the two sets of data points.

Figure 13B:
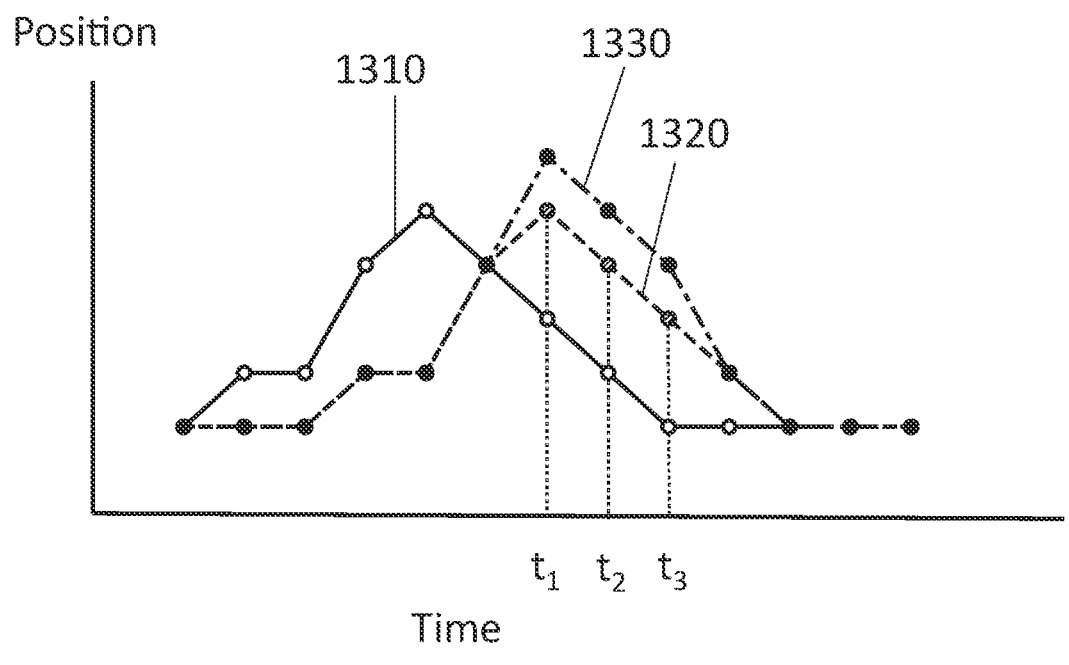

FIG. 13*b* schematically illustrates another diagram with the data points 1310 and 1320 shown again for reference. In the case of FIG. 13*b*, the data points 1330 represent the changes in the position of the viewpoint for the generated image frames and thus the changes in the position of the virtual viewpoint. It can be seen that there is a discrepancy between the changes in the position of the HMD indicated by the tracking data and the changes in the position of the viewpoint calculated by the correlation circuitry 1240 based on the geometric properties of the image features in the generated image frames. In particular, in the example shown it can be seen that the change in position for the virtual viewpoint calculated by the correlation circuitry 1240 differs from the change in the HMD position. As such, in this case there is a discrepancy between the difference data generated by the correlation circuitry 1240 and the position of the HMD indicated by the tracking data, and the correlation circuitry 1240 thus generates the output data indicative of the difference between the difference data and the tracking data. In particular, in this example the output data indicates a difference between the HMD position and the position of the viewpoint calculated for the image frames at $t_1$, $t_2$ and $t_3$. It will be appreciated that a single axis of a coordinate system is shown in FIGS. 13*a* and 13*b* for the purposes of explanation and that three axis may be used and differences in orientation may similarly be indicated by the generated output data.

Hence more generally, the correlation circuitry 1240 is configured to generate output data indicative of a difference between a pose of a virtual viewpoint for the sequence of image frames (which is calculated according to the geometric differences between corresponding image features in different image frames) and a pose of the HMD indicated by the tracking data. The output data may thus indicate at least one of: a difference in position between the position of the virtual viewpoint and the position of HMD; and a difference in orientation between the orientation of the virtual viewpoint and the orientation of the HMD.

The output data may be indicative of a difference between a pose of a virtual viewpoint for an image frame and a pose of the HMD indicated by the tracking data used to generate the image frame. As such, for a perfect system it would be expected that the two poses should match each other and any discrepancies between the poses are indicated by the output data.

Optionally, the output data may be indicative of a latency for the virtual viewpoint with respect to the HMD viewpoint. As shown in FIG. 13a, the position of the virtual viewpoint calculated by the correlation circuitry 1240 for a given image frame lags the position of the real-world viewpoint indicated by the tracking data by an amount indicated by the arrow 1305 due to the latency associated with generating an image frame for display. The tracking data indicative of an HMD pose at a first point in time is used to generate an image frame for display. The image frame is subsequently output and analysed to calculate a viewpoint (or a difference in viewpoint between two image frames) for the image frame, such that by the time that the image frame is output and analysed the tracking data now indicates an updated pose for the HMD different from the pose of the viewpoint calculated for the image frame. Hence, the output data may comprise timing data or offset data indicative of a timing offset between the pose of the real-world viewpoint and the pose of the virtual viewpoint calculated based on the image feature analysis.

Consequently, the data processing apparatus 1200 receives tracking data for an HMD, generates image frames for display in accordance with the tracking data and performs image feature analysis for image features in the image frames to thereby calculate a pose of a virtual viewpoint associated with the image frames and outputs the output data indicating any geometric differences between an ideally expected pose for the virtual viewpoint (which should match the tracking data) and the calculated pose for the virtual viewpoint. Therefore, the output data indicates presence of processing errors and incompatibilities in a graphics processing pipeline resulting in deviation of the actual virtual viewpoint from an expected virtual viewpoint and can be used to assist in debugging.

In some embodiments of the disclosure, the detection circuitry 1220 is configured to detect a position and orientation of the image feature in the first image frame and to detect a position and orientation of the corresponding image feature in the second image frame. The pose (position and orientation) of the image feature in the first image frame as well as the pose of the image feature in the second image frame are detected by the detection circuitry 1220. The pose of the image feature included in the first image frame is dependent on the viewpoint for the first image frame, and similarly the pose of the image feature included in the second image frame is dependent on the viewpoint for the second image frame. In the above discussion, the image feature is a static image feature that is static with respect to the virtual environment. The correlation circuitry 1240 can be configured to apply at least one of a viewpoint translation and a viewpoint rotation to one of the image frames to adjust the viewpoint for the image frame so that the pose of the image feature is adjusted to correspond to the pose of the image feature in the other image frame. In particular, for a particular viewpoint, expressed by position (x, y, z) and orientation given by yaw, pitch, and roll (a, 1, y), the viewpoint can be transformed to a new viewpoint by adjusting any of the above parameters to apply an image warp to the image frame that results in the pose for the image feature matching the pose for the corresponding image feature in the other image frame. For example, geometric vision techniques such as those disclosed in "Finding the exact rotation between two images independently of the translation, L. Kneip et al., LNCS, Vol. 7577 " can be used for establishing viewpoint rotation and translation between image frames, the contents of which are incorporated herein by reference.

Hence more generally, the transform used to translate and/or rotate the viewpoint to match the poses of the image features is thus indicative of the difference between the respective poses of viewpoints for the two image frames. The correlation circuitry 1240 thus calculates the difference between the two viewpoints according to the transform and generates the difference data accordingly. Whilst the above discussion refers to poses of two corresponding image features in respective image frames, it will be appreciated that a plurality of image features may be detected in a given image frame and the warping can be applied for a plurality of image features which can improve reliability. Hence more generally, in some embodiments of the disclosure, the correlation circuitry 1240 is configured to calculate a transform between the viewpoint for the first image frame and the viewpoint for the second image frame in dependence upon the difference between the image feature in a first image frame and the corresponding image feature in a second image frame.

In some embodiments of the disclosure, the detection circuitry 1220 is configured to detect the image feature in the first image frame and the corresponding image feature in the second image frame based on feature matching. A number of possible feature matching operators/algorithms may be executed by the detection circuitry, including one or more from the list consisting of: Harris Corner Detector; Scale-Invariant Feature Transform; Speeded-Up Robust Features Detector; and Features From Accelerated Segment Test. More generally, image features in respective image frames are detected and associated with descriptors comprising image data associated with the image features. A correspondence between image features in different image frames is identified by comparing the descriptors to identify matching image features and differences between the geometric arrangements of the matching features in the image frames are calculated for calculating a translation and/or a rotation of the viewpoint between the image frames.

In some embodiments of the disclosure, the sequence of images frames comprises a sequence of stereoscopic images each including a left image and a right image. The image processing circuitry 1220 can be configured to generate stereoscopic image frames comprising a left image and a right image to be displayed to the left eye and the right eye, respectively (for example, see FIG. 5).

In some embodiments of the disclosure, the correlation circuitry 1240 is configured to calculate a difference between an image feature in either the left image or the right image of a first stereoscopic image frame and the corresponding image feature in either the left image or the right image of a second (subsequent) stereoscopic image frame, respectively. Hence, in the case of a sequence of stereoscopic images an image feature can be detected in a left image (or a right image) of a first stereoscopic image frame and a corresponding image feature can be detected in a left image (or a right image) of another stereoscopic image frame and a difference can be calculated between the two image features to thereby calculate a difference between a viewpoint for the first and second stereoscopic image frames. Consequently, in some embodiments of the disclosure the technique for generating the output data indicating discrepancies between the pose of a virtual viewpoint in a virtual environment and the pose of the HMD viewpoint in the real-world environment may be performed based on feature matching for image features included in either the left images or the right images in a sequence of stereoscopic images.

By generating stereoscopic images for display, a viewer wearing the HMD is given the illusion of depth according to the disparity between the left and right images observed by the user's respective eyes. Stereoscopic images can be displayed on the display unit of the HMD, as shown schematically in FIG. 2, and a depth at which a given image feature (e.g. virtual object) in the stereoscopic image is observed by the user can be controlled to be in-front of, behind or at substantially the same depth as the display unit of the HMD based on the disparity for the given image feature. Typically, if a virtual object is to be observed in front of the display screen, the left and right images are displayed with disparity in a so-called reverse direction. If the virtual object is to be observed at the same depth as the display screen, there is typically no disparity in the left and right images of the virtual object. If the virtual object is to be observed behind the display screen, the left and right images are typically displayed with disparity for the virtual object.

Figure 14:
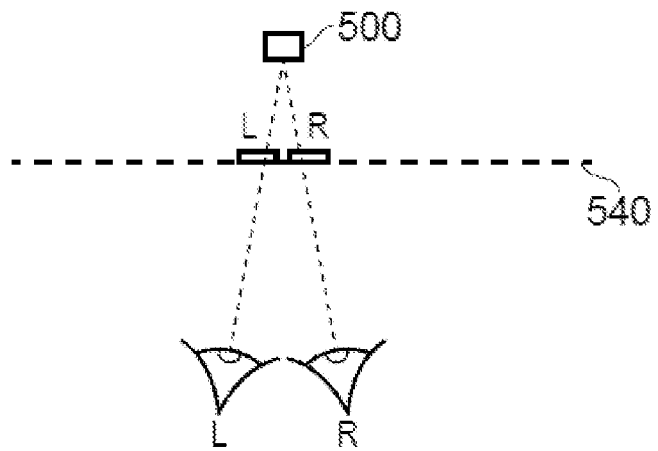
FIG. 14 schematically illustrates an HMD display unit displaying a stereoscopic image.

FIG. 14 schematically illustrates a display unit 540 displaying a stereoscopic image comprising a left image and a right image with a vergence distance such that the virtual object 500 is observed behind the position of the display screen (which is to say, further away from the viewer than the display screen position). In the case of the virtual object being a static feature in a virtual environment, the depth at which the virtual object is observed by the user with respect to the HMD viewpoint should vary accordingly with changes in the HMD viewpoint with respect to the depth direction. For example, when a virtual object is observed by the user as being positioned Z metres away from the user in the depth direction (e.g. direction of Z axis) and the HMD subsequently moves towards the virtual object in the depth direction, the virtual object should subsequently be observed by the user at a different depth that is closer to the HMD.

In some embodiments of the disclosure, the correlation circuitry 1240 is configured to calculate a first vergence distance for an image feature in dependence upon the image feature in both the left image and the right image of the first image frame. The detection circuitry 1220 can detect the image feature in the first image frame by detecting the image feature in both the left image and the right image of the first image frame. As such, a position of the image feature in the left image and a position of the image feature in the right image can be detected. Based on the lateral separation between the image features and the positions of the user's eyes (which are predetermined positions set in advance for the HMD with respect to the position of the display unit), a vergence distance at which the lines of sight for the two eyes intersect for the image feature can be calculated. The vergence distance thus represents the distance from the user's eyes at which the image feature is to be observed by the user.

In some embodiments of the disclosure, the detection circuitry 1220 is configured to calculate a second vergence distance for the image feature in dependence upon the image feature in both the left image and the right image of the second image frame. As such, in addition to calculating the first vergence distance (first depth at which the image feature is observed for the first image frame), a second vergence distance (second depth at which the image feature is observed for another later image frame) can also be calculated. Due to movement of the HMD, the first image frame should result in the image feature being observed at a different depth to when the image feature is observed in the second image frame. For example, in the case where the first image frame is generated using tracking data indicating a position (0, 0, 0) and the second image frame is generated using tracking data indicating a position (0, 0, Z2) such that the HMD has moved in the direction of the Z axis by a distance Z2 towards the observed image feature, the first vergence distance associated with the first image frame should be greater than the second vergence distance associated with the second image frame. Conversely, in the case where the first image frame is generated using tracking data indicating a position (0, 0, 0) and the second image frame is generated using tracking data indicating a position (0, 0, −Z2) such that the HMD has moved in the direction of the Z axis by a distance Z2 away from the observed image feature, the first vergence distance associated with the first image frame should be smaller than the second vergence distance associated with the second image frame. Hence, the correlation circuitry 1240 is operable to calculate the first vergence distance and the second vergence distance, calculate a difference between the two vergence distances and compare the calculated difference to the tracking data associated with the first and second image frames to determine whether the difference between the two vergence distances matches the change in the separation distance of the HMD with respect to the depth direction for the image feature. In an ideal system, the difference between the two vergence distances should correspond to the change in the separation distance of the HMD with respect to the depth direction for the image feature as indicated by the difference in the tracking data used for the first image frame and the tracking data used for the second image frame. However, errors in one or more stages of a graphics processing pipeline can lead to discrepancies between the geometric properties of the generated image frames and the change in the position of the HMD for the image frames, such that the user may perceive the displayed images as not faithfully tracking the user's head movements. Hence, the correlation circuitry 1240 is further operable to generate the output data in dependence upon a difference between the two vergence distances and the change in the position of the HMD in the depth direction indicated by the tracking data used for the first and second image frames, to thereby identify geometric errors. Consequently, the output data indicates presence of processing errors in a graphics processing pipeline resulting in deviation of the vergence distance from an expected vergence distance and which can be used to assist in debugging.

Hence more generally, in some embodiments of the disclosure the detection circuitry 1220 is configured to detect the image feature in the second image frame by detecting the image feature in both the left image and the right image of the second image frame, and wherein the correlation circuitry 1240 is configured to: calculate a second vergence distance for the image feature in dependence upon the image feature in both the left image and the right image of the second image frame; generate vergence distance difference data indicative of a difference between the first vergence distance and the second vergence distance; and generate the output data in dependence upon a difference between the vergence distance difference data and the tracking data associated with the first and second image frames.

Figure 15:
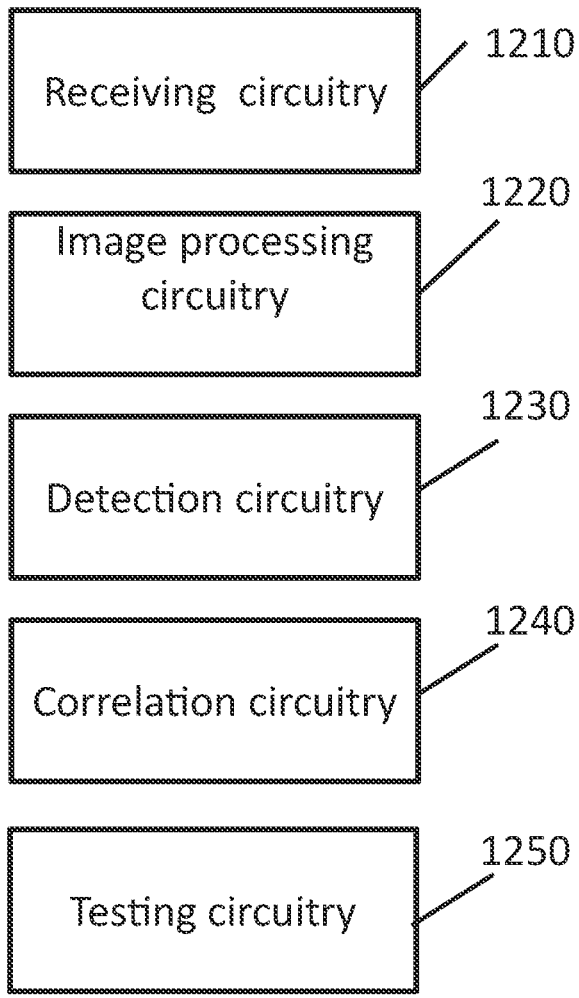
FIG. 15 schematically illustrates another data processing apparatus.

Referring now to FIG. 15, in some embodiments of the disclosure the data processing apparatus 1200 comprises testing circuitry 1250 configured to generate test tracking data, wherein the image processing circuitry 1220 is configured to generate at least one image frame for display in dependence upon the test tracking data. The testing circuitry 1250 is configured to generate test tracking data indicative of a position and/or orientation of an HMD. The test tracking data may for example indicate a three-dimensional position using a three dimensional coordinate system and/or an orientation with respect to the three dimensional coordinate system. For example, the 3D position and/or orientation may be indicated with respect to a reference point (origin point) that is the same as the reference point associated with the tracking data received by the receiving circuitry 1210. Alternatively, the test tracking data may indicate a relative change in a three-dimensional position and/or orientation rather than indicating a position and/or orientation with respect to a reference point.

The image processing circuitry 1220 is configured to generate the sequence of image frames in dependence upon the tracking data received by the receiving circuitry 1210 and to generate at least one image frame in the sequence of image frames in dependence upon the test tracking data. The sequence of image frames thus comprises a plurality of successive image frames each having an associated viewpoint, and at least one image frame in the sequence of image frames is generated with a viewpoint dependent upon the test tracking data.

The at least one image frame may be generated by using just the test tracking data to determine the viewpoint for the at least one image frame. For example, the receiving circuitry 1210 may receive a stream of tracking data providing an indication HMD position and/or orientating at periodic time intervals, and for a given image frame the image processing circuitry 1220 can be configured to use the test tracking data for generating the given image frame instead of using the received tracking data.

Alternatively, rather than using the test tracking data to replace the tracking data for generating a given image frame, the test tracking data may be used to modify the tracking data. As such, in some cases the image processing circuitry 1220 is configured to generate a given image frame in dependence upon both the received tracking data and the test tracking data. For example, the received tracking data may indicate a 3D position (x, y, z) and the test tracking data may indicate a change in the 3D position such as (x1, y1, z1) such that the combination of the received tracking data and the test tracking data at a given timestamp indicates a 3D position that is (x+x1, y+y1, z+z1). Similarly, the test tracking data may indicate a negative change with respect to any of the x, y or z axis.

Hence more generally, the test tracking data can be combined with the received tracking data to modify the received tracking data to thereby obtain modified tracking data, and the image processing circuitry 1220 can be configured to generate at least one image frame in dependence upon the modified tracking data. Alternatively, as explained above, the received tracking data may instead be directly substituted with the test tracking data.

In this way, the image processing circuitry 1220 generates a sequence of image frames for display, in which at least one image frame is generated for display in dependence upon the test tracking data. Therefore, the testing circuitry 1250 can be used to provide test HMD pose data (test tracking data) which is provided to the image processing circuitry 1220 allowing for so-called "fake HMD poses" to be injected into the graphics processing pipeline. Consequently, the test HMD pose data can be provided as an input at a controlled point in time and the test HMD pose data will subsequently be reflected in a change in the viewpoint associated with generated image frames. In particular, by inputting the test HMD pose data at a known point in time and using the techniques discussed above to detect image features in the image frames and generate difference data indicating a difference in a viewpoint between two image frames, a sudden change in the viewpoint due to the test HMD pose data can be identified at a specific image frame generated by the image processing circuitry 1220. For example, the test HMD pose data may be a step input which effectively adds (or subtracts) a fixed amount to the received tracking data (e.g. by introducing an offset amount with respect to the position with respect to at least one axis of the 3D coordinate system), in which case the difference data suddenly indicates a shift in the viewpoint at a given image frame in the sequence of image frames. Therefore, the time between the test HMD pose data being input and the time between outputting an image frame reflecting the viewpoint pose change associated with the test HMD pose data can be calculated.

Hence, in some embodiments of the disclosure the correlation circuitry 1240 is configured to generate the difference data and to calculate a latency for the image frame generation processing by the image processing circuitry 1220 in dependence upon the test tracking data and the difference data.

Whilst the above discussion refers to using the test tracking data as a controlled input to the image processing circuitry 1220 to allow quick and reliable calculation of latency for generating image frames for display, the correlation circuitry 1240 can optionally be configured to calculate the latency without using the testing circuitry 1250. As explained previously with reference to FIGS. 13*a* and 13*b*, the correlation circuitry 1240 is configured to generate output data indicative of a difference between a pose of a virtual viewpoint for the sequence of image frames (which is calculated according to the geometric differences between corresponding image features in different image frames) and a pose of the HMD indicated by the tracking data. As shown in FIG. 13*a*, the position of the virtual viewpoint calculated by the correlation circuitry 1240 lags the position of the real-world viewpoint indicated by the tracking data by an amount indicated by the arrow 1305 due to the latency associated with generating an image frame for display. Hence, in some embodiments of the disclosure the correlation circuitry 1240 is configured to calculate a latency for the image frame generation processing by the image processing circuitry in dependence upon the received tracking data and the difference data and to generate the output data comprising timing data indicative of a latency for the image frame generation processing.

In some embodiments of the disclosure, the testing circuitry 1250 is configured to predict a pose for the HMD in dependence upon the tracking data received by the receiving circuitry 1210 and to generate the test tracking data comprising at least one predicted pose for the HMD. The testing circuitry 1250 can be configured to predict a future position and/or orientation of the HMD based on the tracking data for the HMD. One or more suitable predictive tracking algorithms may be used for this purpose. In some examples, the testing circuitry 1250 comprises a machine learning model configured to generate the test tracking data in dependence upon the tracking data received by the receiving circuitry 1210. The machine learning model is trained using previous instances of HMD tracking data. In response to receiving an input comprising a plurality of HMD poses, the machine learning model generates an output indicative of a predicted HMD pose for the input.

As such, the testing circuitry 1250 can be configured to predict a future HMD pose in dependence upon the received tracking data. For example, in response to receiving a stream of tracking data indicating a trajectory of movement for the HMD, the testing circuitry 1250 can generate an output indicative of one or more predicted HMD poses for the trajectory. Hence, the testing circuitry 1250 can be configured to generate the test tracking data comprising at least one predicted HMD pose and the image processing circuitry 1220 generates one or more image frames for display in dependence upon the test tracking data. Consequently, using knowledge of the calculated latency (e.g. time period 1305 shown in FIG. 13a), the test tracking data can be generated by the testing circuitry 1250 for input to the image processing circuitry 1220 at a controlled time so that a predicted HMD pose is input at a time ahead with respect to when the received tracking data (obtained by tracking the HMD) indicating such an HMD pose would be input, and one or more image frames can be generated for display in dependence upon the test tracking data to thereby remove or at least reduce an amount of latency by which the virtual viewpoint lags the real-world viewpoint for the HMD. Put differently, by generating test tracking data comprising at least one predicted HMD pose, the timing difference (shown by the arrow 1305) between the tracked pose of the HMD and the tracked pose being reflected in the viewpoint of the image frames output for display is reduced and in some cases may be substantially reduced to completely remove presence of the lag.

In some embodiments of the disclosure, the image processing circuitry 1220 is configured to generate each image frame for display by applying an image distortion in dependence upon at least one optical element of the HMD. The image processing circuitry 1220 can generate the image frames for display by applying an image distortion to an image frame to correct for a distortion associated with an optical element of the HMD. Distortion of light may occur when light is directed (e.g. converged or diverged) by an optical element that comprises one or more lenses and/or one or more mirrors. For example, the geometry of a lens may mean that light that is incident upon the lens may be refracted differently by different portions of the lens, and thus light may be directed differently depending on which portion of the lens is responsible for directing the light. The image processing circuitry 1220 can thus apply an inverse distortion opposite to the distortion associated with the optical element to counteract the distortion of the optical element. Hence, the reverse image distortion may be applied by rendering an image frame and warping the image frame in a post-process effect. In particular, to counteract a pincushion distortion associated with an optical element of an HMD, the image processing circuitry 1220 can apply a barrel distortion to substantially cancel the distortion so that a viewing user observes a substantially undistorted image. Hence, the detection circuitry 1230 can be configured to detect image features in the image frames having the image distortion applied thereto and detect differences between the image features in the image frames. Alternatively, the detection circuitry 1230 can be configured to detect image features in the image frames by detecting one or more image features in an image frame prior to the image distortion being applied to the image frame.

Figure 16:
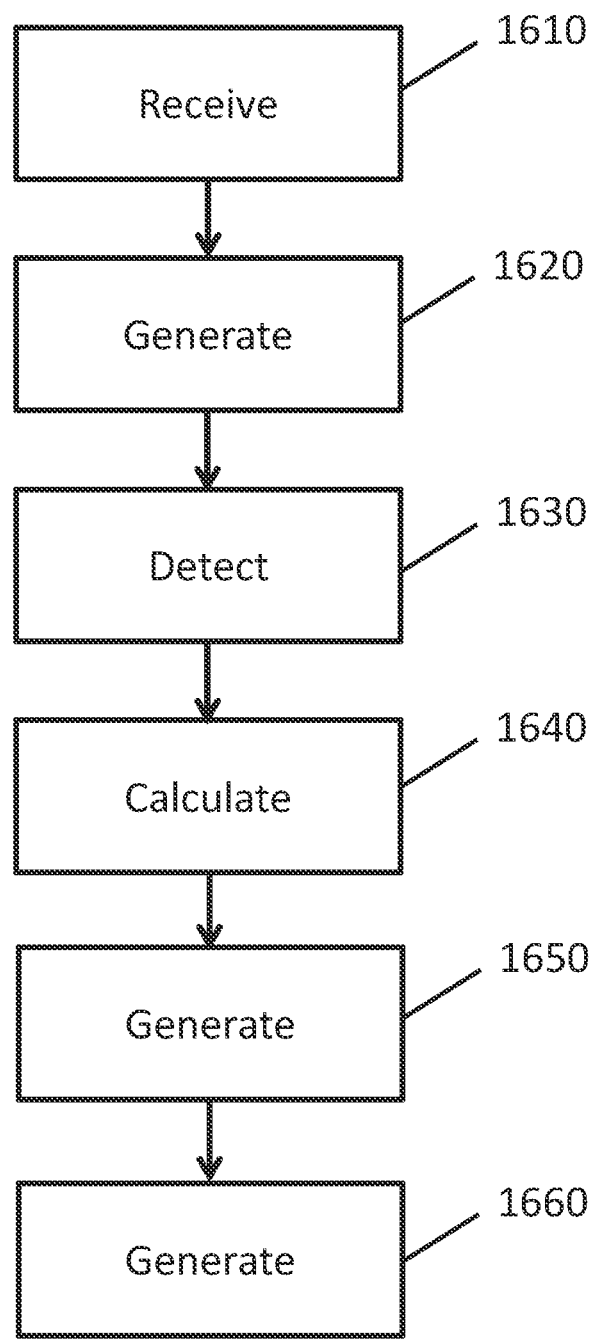
FIG. 16 is a schematic flowchart illustrating a data processing method.

Referring now to FIG. 16, in embodiments of the disclosure a data processing method comprises:

receiving (at a step 1610) tracking data indicative of a tracked pose for a head-mountable display (HMD);

generating (at a step 1620) a sequence of images frames for display in dependence upon the tracking data;

detecting (at a step 1630) an image feature in a first image frame and a corresponding image feature in a second image frame;

calculating (at a step 1640) a difference between the image feature in the first image frame and the corresponding image feature in the second image frame;

generating (at a step 1650) difference data indicative of a difference between a viewpoint for the first image frame and a viewpoint for the second image frame in dependence upon the difference between the image feature in the first image frame and the corresponding image feature in the second image frame; and generating (at a step 1660) output data in dependence upon a difference between the difference data and the tracking data associated with the first and second image frames.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A data processing apparatus comprising:
receiving circuitry to receive tracking data indicative of at least one of a tracked position and a tracked orientation of a head-mountable display (HMD);
image processing circuitry to generate a sequence of image frames for display in dependence upon the tracking data for the HMD, in which the image processing circuitry is configured to generate the sequence of image frames with viewpoints that change according to changes in at least one of the tracked position and the tracked orientation of the HMD indicated by the tracking data for the HMD;
detection circuitry to detect image features in the sequence of image frames generated by the image processing circuitry, in which the detection circuitry is configured to detect at least an image feature included in a first image frame generated for display at a first time with a first viewpoint and a corresponding image feature included in a second image frame generated for display at a second time with a second viewpoint different from the first viewpoint; and
correlation circuitry to:
calculate a difference between the image feature in the first image frame and the corresponding image feature in the second image frame;
generate difference data indicative of a difference between the first viewpoint for the first image frame and the second viewpoint for the second image frame in dependence upon the difference between the image feature in the first image frame and the corresponding image feature in the second image frame; and
generate output data in dependence upon a difference between the difference data and the tracking data used to generate the first and second image frames, the output data being indicative of discrepancy for the difference between the first viewpoint and the second viewpoint and a difference between at least one of the tracked position and the tracked orientation of the HMD indicated by the tracking data used to generate the first and second image frames.

2. The data processing apparatus according to claim 1, wherein the detection circuitry is configured to detect a position and orientation of the image feature in the first image frame and to detect a position and orientation of the corresponding image feature in the second image frame.

3. The data processing apparatus according to claim 1, wherein the correlation circuitry is configured to calculate a transform between the first viewpoint for the first image frame and the second viewpoint for the second image frame in dependence upon the difference between the image feature and the corresponding image feature.

4. The data processing apparatus according to claim 1, wherein the sequence of images frames comprises a sequence of stereoscopic images each including a left image and a right image.

5. The data processing apparatus according to claim 4, wherein the correlation circuitry is configured to calculate a difference between the image feature in either the left image or the right image of the first image frame and the corresponding image feature in either the left image or the right image of the second image frame, respectively.

6. The data processing apparatus according to claim 4, wherein the detection circuitry is configured to detect the image feature in the first image frame by detecting the image feature in both the left image and the right image of the first image frame.

7. The data processing apparatus according to claim 6, wherein the correlation circuitry is configured to calculate a first vergence distance for the image feature in dependence upon the image feature in both the left image and the right image of the first image frame.

8. The data processing apparatus according to claim 7, wherein the detection circuitry is configured to detect the image feature in the second image frame by detecting the image feature in both the left image and the right image of the second image frame, and wherein the correlation circuitry is configured to:
calculate a second vergence distance for the image feature in dependence upon the image feature in both the left image and the right image of the second image frame;
generate vergence distance difference data indicative of a difference between the first vergence distance and the second vergence distance; and
generate the output data in dependence upon a difference between the vergence distance difference data and the tracking data associated with the first and second image frames.

9. The data processing apparatus according to claim 1, comprising testing circuitry configured to generate test tracking data, wherein the image processing circuitry is configured to generate at least one image frame for display in dependence upon the test tracking data.

10. The data processing apparatus according to claim 9, wherein the testing circuitry is configured to predict a pose for the HMD in dependence upon the tracking data and to generate the test tracking data comprising at least one predicted pose for the HMD.

11. The data processing apparatus according to claim 1, wherein the correlation circuitry is configured to calculate a latency for the image frame generation processing by the image processing circuitry.

12. The data processing apparatus according to claim 1, wherein the image processing circuitry is configured to generate each image frame for display by applying an image distortion in dependence upon at least one optical element of the HMD.

13. The data processing apparatus according to claim 1, wherein the tracking data is generated in dependence upon captured images and/or one or more inertial sensors of the HMD.

14. A data processing method comprising:
receiving tracking data indicative of at least one of a tracked position and a tracked orientation for a head-mountable display (HMD);
generating, by image processing circuitry, a sequence of image frames for display in dependence upon the tracking data for the HMD, in which the step of generating comprises generating the sequence of image frames with viewpoints that change according to changes in at least one of the tracked position and the tracked orientation of the HMD indicated by the tracking data for the HMD;
detecting image features in the sequence of image frames generated by the image processing circuitry by detecting at least an image feature included in a first image frame generated for display at a first time with a first viewpoint and detecting a corresponding image feature included in a second image frame generated for display at a second time with a second viewpoint different from the first viewpoint;
calculating a difference between the image feature in the first image frame and the corresponding image feature in the second image frame;
generating difference data indicative of a difference between the first viewpoint for the first image frame and the second viewpoint for the second image frame in dependence upon the difference between the image feature in the first image frame and the corresponding image feature in the second image frame; and
generating output data in dependence upon a difference between the difference data and the tracking data used to generate the first and second image frames, the output data being indicative of discrepancy for the difference between the first viewpoint and the second viewpoint and a difference between at least one of the tracked position and the tracked orientation of the HMD indicated by the tracking data used to generate the first and second image frames.

15. Computer software which, when executed by a computer, causes the computer to carry out a method comprising:
receiving tracking data indicative of at least one of a tracked position and a tracked orientation for a head-mountable display (HMD);
generating, by image processing circuitry, a sequence of imageimages frames for display in dependence upon the tracking data for the HMD, in which the step of generating comprises generating the sequence of image frames with viewpoints that change according to changes in at least one of the tracked position and the tracked orientation of the HMD indicated by the tracking data for the HMD;
detecting image features in the sequence of image frames generated by the image processing circuitry by detecting at least an image feature included in a first image frame generated for display at a first time with a first viewpoint and detecting a corresponding image feature included in a second image frame generated for display at a second time with a second viewpoint different from the first viewpoint;

calculating a difference between the image feature in the first image frame and the corresponding image feature in the second image frame;

generating difference data indicative of a difference between the first viewpoint for the first image frame and the second viewpoint for the second image frame in dependence upon the difference between the image feature in the first image frame and the corresponding image feature in the second image frame; and generating output data in dependence upon a difference between the difference data and the tracking data used to generate the first and second image frames, the output data being indicative of discrepancy for the difference between the first viewpoint and the second viewpoint and a difference between at least one of the tracked position and the tracked orientation of the HMD indicated by the tracking data used to generate the first and second image frames.

* * * * *